No. 787,824.

Patented April 18, 1905.

UNITED STATES PATENT OFFICE.

RENÉ BOHN, OF MANNHEIM, GERMANY, ASSIGNOR TO THE BADISCHE ANILIN & SODA FABRIK, OF LUDWIGSHAFEN-ON-THE-RHINE, GERMANY, A CORPORATION OF BADEN.

PROCESS OF MAKING BLACK DYES.

SPECIFICATION forming part of Letters Patent No. 787,824, dated April 18, 1905.

Application filed April 29, 1904. Serial No. 205,587.

*To all whom it may concern:*

Be it known that I, RENÉ BOHN, doctor of philosophy and chemist, a citizen of the Swiss Republic, residing at Mannheim, in the Grand Duchy of Baden, German Empire, have invented new and useful Improvements in Black Dyes and Processes of Making the Same, of which the following is a specification.

My invention relates to the production of coloring-matters from naphthazarin.

In the specification of Letters Patent No. 631,613, dated August 22, 1899, I have described the production of blue-black coloring-matters by condensing naphthazarin with aromatic amins and afterward sulfonating the condensation products. I have now discovered that coloring-matters can be obtained by directly condensing naphthazarin, while suspended in water and in the presence of boric acid, with the sulfonic acids of aromatic amins. The coloring-matters obtained in this manner yield shades which on treatment with a bichromate become deep blue-black.

The products of the process according to my invention are included among those claimed generically in the above-mentioned Letters Patent No. 631,613.

The following examples will serve to further illustrate the nature of my invention, which, however, is not limited to these examples. The parts are by weight:

Example 1: Mix together two hundred (200) parts of naphthazarin in the form of a fifty (50) per cent. paste, one hundred (100) parts of commercial sodium sulfanilate containing eighty (80) per cent. of the pure compound, four hundred (400) parts of water, and twenty (20) parts of crystallized boric acid. Stir this mixture well for from forty-eight (48) to seventy-two (72) hours, maintaining it at a temperature of from twenty-five (25) to thirty degrees centigrade, (30° C.) When the reaction is complete, (which is the case when a test portion is completely soluble in water,) pour the mixture into fifteen hundred (1,500) parts of concentrated salt solution, filter off the coloring-matter, and press and dry. This coloring-matter is a brown powder with a metallic appearance. It dissolves in water, yielding a dull-fuchsin-red solution which on the addition of caustic soda becomes violet. It yields a blue-violet solution in concentrated sulfuric acid.

Example 2: Dissolve one hundred (100) parts of the sodium salt of metanilic acid in four hundred (400) parts of water and add thirty (30) parts of boric-acid crystals and two hundred (200) parts of naphthazarin-paste containing about fifty (50) per cent. of naphthazarin. Stir the whole at a temperature of about twenty-five degrees centigrade (25° C.) for from about thirty (30) to forty (40) hours, at the end of which time the deep-brown mixture, which during the first few hours becomes viscous and homogeneous, is completely soluble in water. Then treat the whole with a saturated solution of common salt, filter, wash with more salt solution, and press and dry the coloring-matter, which is thus obtained as a violet-brown powder. Its solution in water is deep red and turns violet-blue on the addition of caustic soda. It yields a reddish-violet solution in concentrated sulfuric acid.

Example 3: Dissolve one hundred and twenty (120) parts of the sodium salt of 2.5-naphthylamin sulfo-acid in seven hundred (700) parts of water and add forty (40) parts of boric-acid crystals and two hundred (200) parts of naphthazarin-paste containing about fifty (50) per cent. of naphthazarin. Stir the whole at a temperature of about twenty-five degrees centigrade (25° C.) for from about thirty (30) to forty (40) hours until it is completely soluble in water. Treat the whole with a saturated solution of common salt, filter, wash with more salt solution, and press and dry the coloring-matter, which is thus obtained as a bluish-brown powder. Its solution in water is violet-red and turns violet-blue on the addition of caustic soda. It yields a blue-violet solution in concentrated sulfuric acid.

The processes for dyeing with these coloring-matters may be the same as those which are used for dyeing with naphthazarin.

Instead of ordinary naphthazarin (obtainable from 1.5-dinitro-naphthalene) the coloring-matter obtained from 1.8-dinitro-naphthalene according to the specification of Letters Patent No. 661,438 can be used, and instead of sulfanilic acid equivalent quantities of sulfo-acids of other aromatic amins can be employed and similar coloring-matters be obtained.

Now what I claim is—

1. The process for the production of coloring-matters by condensing naphthazarin with a sulfo-acid of an aromatic amin.

2. The process for the production of coloring-matter by condensing naphthazarin with metanilic acid.

In testimony whereof I have hereunto set my hand in the presence of two subscribing witnesses.

RENÉ BOHN.

Witnesses:
ERNEST G. EHRHARDT,
J. ALEC. LLOYD.